United States Patent [19]

Akagi et al.

[11] Patent Number: 5,426,363
[45] Date of Patent: Jun. 20, 1995

[54] OBJECT DETECTING DEVICE

[75] Inventors: Tadanori Akagi; Takahiro Imai, both of Tokyo; Masatosi Kubo, Hyougo, all of Japan

[73] Assignee: Kabushiki Kaisha Honda Denshi Giken, Machida, Japan

[21] Appl. No.: 110,939

[22] Filed: Aug. 24, 1993

[30] Foreign Application Priority Data

Apr. 26, 1993 [JP] Japan .................. 5-123550
Apr. 30, 1993 [JP] Japan .................. 5-128535

[51] Int. Cl.⁶ ............... G01N 27/72; G08G 1/042
[52] U.S. Cl. ............... 324/239; 324/207.17; 324/225; 340/941
[58] Field of Search ........... 324/239, 225, 228, 262, 324/207.26, 207.12, 207.15, 207.16, 207.17; 340/933, 938, 939, 941

[56] References Cited

U.S. PATENT DOCUMENTS 4,232,285 11/1980 Narbaits-Jaureguy et al. .... 340/941
4,276,539 6/1981 Eshraghian et al. ............. 340/939
4,383,239 5/1983 Robert ........................ 340/933
4,894,617 1/1990 Urbani ........................ 324/239
4,968,979 11/1990 Mizuno et al. ................. 340/941

Primary Examiner—O'Shea: Sandra L.
Assistant Examiner—Roger C. Phillips
Attorney, Agent, or Firm—Kanesaka & Takeuchi

[57] ABSTRACT

An object detecting device for detecting an object at least partly having a magnetic substance or magnetic-flux permeable material is formed of a detection coil arrangement including a primary coil for generating magnetic flux and a secondary coil disposed separately from the primary coil at a predetermined interval for receiving the magnetic flux from the primary coil; and a detection circuit for detecting an increase of the magnetic flux transmitted to the secondary coil due to presence of the object within a space between the primary and secondary coils. The detection circuit produces signal indicating the presence of the object upon detection of the presence.

11 Claims, 6 Drawing Sheets

OBJECT DETECTING DEVICE

BACKGROUND OF THE INVENTION

1. Field of the Invention

The present invention generally relates to an object detecting device for detecting the fact that an object is positioned in a predetermined area, and particularly relates to an object detecting device arranged in such a manner that a magnetic-flux generating source and a detector portion are disposed separately from each other in a predetermined area so that when an object at least partly having a magnetic substance or magnetic-flux permeable material such as iron is positioned above the area, the magnetic flux is transmitted to the detector portion through the magnetic substance or magnetic-flux permeable material such as iron of the object so that the presence of the object is detected on the basis of a change in the detected magnetic flux.

2. Description of the Prior Art

In order to park plurality of objects, for example, vehicles such as cars, motor bicycles, and so on, each of which contains a magnetic substance or magnetic-flux permeable material such as iron, in a parking zone, vehicle detecting devices are provided respectively in parking sections of the parking zone so as to detect presence of parked vehicles. Such a vehicle detecting device is made by using light rays, an ultrasonic wave, or a microwave, or by using a buried loop coil. More specifically, a pole provided with a light emitting device or an oscillator for generating an ultrasonic wave or a microwave is planted in the vicinity of an inlet of each of the parking sections. Alternatively, a light emitting device or an oscillator for generating an ultrasonic wave or a microwave is provided on the ceiling of the parking zone so as to emit light rays, an ultrasonic wave, or a microwave toward each of the parking sections. Existence of a vehicle is detected by detecting shielding of light rays due to presence of the vehicle in the case of using the light rays, or by catching a reflection wave which changes by presence of the vehicle in the case of using an ultrasonic wave or a microwave. Alternatively, a loop coil is buried in the ground in each of the parking sections so that presence of a vehicle is detected by detecting a change in inductance of the loop coil caused by presence of the vehicle in the section.

However, the light rays from the light emitting device or an ultrasonic wave or a microwave from the oscillator spread in proportion to the distance from the light emitting device or from the oscillator to a vehicle in a target section, so that there is a possibility that not only the vehicle in the target section but any other vehicles in other sections adjacent to the target section may be detected by the light rays or by the ultrasonic wave or microwave when the ceiling of the parking zone is high. In order to prevent such erroneous detection from occurring, it is necessary to focus or condense the light rays, the ultrasonic wave or the microwave. If the light rays, the ultrasonic wave or the microwave are focused or condensed so narrowly, however, there occurs another defect that also a human body may be detected. In the method of catching a reflection wave, on the other hand, an ultrasonic wave or a microwave may be reflected in an unexpected direction depending on the curved surface of a car body or the angle of a front glass so that sometimes it becomes impossible to catch the reflection wave. Further, when a light emitting device or an oscillator is incorporated in a pole at a lower portion thereof, the light emitting device or the oscillator is broken frequently by mischief or the like. Moreover, in the case of detection by using light rays, since it is necessary to set a photo-detector portion on the floor surface even if the light emitting device is attached on a high position such as a ceiling or the like to prevent mischief, there is a possibility that the photo-detector portion is damaged or covered with dust to thereby operate erroneously. Further, in the case of detection by using a loop coil, there is a defect that a wide area is occupied by the loop coil because the loop coil is required to stretch over an area of about $1.5 \times 1.5$ $m^2$ at minimum, although the loop coil can be protected from such mischief because it is buried in the ground.

SUMMARY OF THE INVENTION

An object of the present invention is to provide an object detecting device which can surely detect an object such as a car, a container, a housing, or the like, at least partly having a magnetic substance or magnetic-flux permeable material such as iron, and which can be set up easily.

Another object of the present invention is to provide an object detecting device, the sensitivity of which can be made high without receiving any influence of the open-air temperature, and which can detect an object surely even when the magnetic substance or magnetic-flux permeable material such as iron is located at a high position.

In order to attain the above objects, according to an aspect of the present invention, the object detecting device for detecting an object at least partly having a magnetic substance or magnetic-flux permeable material, comprises: a detection coil means including a primary coil for generating magnetic flux and a secondary coil disposed separately from the primary coil at a predetermined interval for receiving the magnetic flux from the primary coil; and a detection circuit for detecting an increase of the magnetic flux transmitted to the secondary coil due to presence of the object within a space between the primary and secondary coils and for producing a signal indicating the presence of the object upon detection of the presence.

The magnetic flux from the primary coil is received by the secondary coil. At this time, the quantity of the magnetic flux received by the secondary coil is small when no object is present between the primary and secondary coils. When an object is present between or in a predetermined region above the primary and secondary coils, however, magnetic flux from the primary coil is made to flow into the secondary coil through the magnetic substance or magnetic-flux permeable material of the object so that the quantity of the magnetic flux received by the secondary coil increases. Thus, the presence of the object can be detected if this increase is detected. Since the transmission or passage of magnetic flux is not shielded by a nonmagnetic material, the object detecting device may be covered with a nonmagnetic material such as asphalt, a polyvinyl chloride plate, a hard glass plate, or the like. If the object detecting device is covered with such asphalt, therefore, the set position of the object detecting device can be hidden to make it possible to protect the device from mischief or the like.

In this case, it is preferable to arrange the primary and secondary coils to be slanting relative to each other so that virtual extensions of the respective axial lines of the primary and secondary coils cross each other. Thus, even if the distance between the primary and secondary coils is selected to be long, magnetic flux can be surely transmitted from the primary coil to the secondary coil and the presence of an object can be surely detected even if it is present at a high position above the object detecting device. Further, since the distance between the two coils can be made long, erroneous detection can be prevented from occurring even if a small object not to be detected is present above the object detecting device.

In the above-mentioned object detecting device according to of the present invention, preferably, the detection circuit is constituted by: a take-out coil for taking-out a voltage corresponding to the magnetic flux generated in the primary coil; a comparison means for comparing voltages induced respectively in the take-out and secondary coils with each other; and an adjustment means for adjusting an output voltage of the take-out coil so as to make an output of the comparison means be zero when the object is not present in a predetermined effective detection range above the object detecting device. In this structure, an increase of the output voltage can be detected as a change of the amplitude to thereby make the sensitivity high. Further, if the primary coil is excited with a predetermined frequency by means of an oscillator in order to discriminate its own object detecting device from others and only a signal of the predetermined frequency is taken out through a band-pass filter, it is possible to prevent erroneous detection caused by an erroneous operation of the band-pass filter due to the surrounding temperature or noises.

In the above-mentioned object detecting device according to of the present invention, preferably, the detection circuit is constituted by: a setting means for setting a voltage induced in the secondary coil when the object is not present in a predetermined effective detection range above the object detecting device; a secondary-coil comparison means for comparing an output voltage level of the setting means with a voltage level induced in the secondary coil; and a storage and comparison means for storing an output voltage level of the secondary-coil comparison means when the object is not present in the predetermined effective detection range above the object detecting device and for comparing the stored output voltage level with an output voltage level of the secondary-coil comparison means so as to produce the signal when the voltage level of the secondary-coil comparison means is higher than the storage voltage level. In this structure, an increase of the output voltage of the secondary coil can be detected as a change of the level to thereby make it possible to make the sensitivity high. Further, in the case of using a band-pass filter as described above, it is possible to surely detect an object with no erroneous detection even if the phase of the band-pass filter is varied depending on the surrounding temperature or the like, because a level change in the frequency band is small in comparison with the variation of phase.

Further objects and advantages of the present invention will become clearer from the following description of the preferred embodiments.

DESCRIPTION OF THE PREFERRED EMBODIMENTS

Referring to the accompanying drawings, now, preferred embodiments of the present invention will be described with respect to a case where presence of a vehicle is detected by way of example. Through the embodiments, substantially the same or equivalent constituent components are referenced correspondingly and repeated description with respect to those constituent components will be omitted.

First, referring to FIGS. 1 through 5, a first embodiment of the object detecting device according to the present invention will be described. An object detecting device 10 has a pair of transmission and reception coil portions 11 and 12 which are disposed with a predetermined interval therebetween. The transmission coil portion 11 is constituted by a primary coil 13 for emitting magnetic flux in the up/down direction in FIG. 1 and a take-out coil 14 for taking-out a voltage corresponding to the magnetic flux generated in the primary coil 13. The reception coil portion 12 is constituted by a secondary coil 15 for receiving the magnetic flux from the primary coil 13 of the transmission coil portion 11. The primary coil 13 of the transmission coil portion 11 is connected to an oscillator 16 through an amplifier 17. The oscillator 16 is formed so as to produce oscillation with a predetermined frequency in the order of scores of KHz so that no electric wave due to an influence of direct-current magnetism or earth magnetism is sent out from the oscillator 16. The output signal of the oscillator 16 is supplied to the transmission coil portion 11 through the amplifier 17 so that magnetic flux is generated from the primary coil 13. The amplifier 17 is provided to carry out current amplification so as to supply a sufficiently strong current to the primary coil 13 so that the primary coil 13 generates a strong magnetic field. The output side of the take-out coil 14 of the transmission coil portion 11 is connected to one input of an adder 19 through an attenuator 18. The other input of the adder 19 is connected to the output side of the secondary coil 15 of the reception coil portion 12. The attenuator 18 is provided for adjusting the level of the output voltage of the take-out coil 14 so that the sum of the respective output voltages of the take-out coil 14 and the secondary coil 15 is equal to zero when any vehicle 21 is not present in a predetermined effective detection range above the pair of transmission and reception coil portions 11 and 12, the output of the attenuator 19 being supplied to the adder 19.

Figure 1:
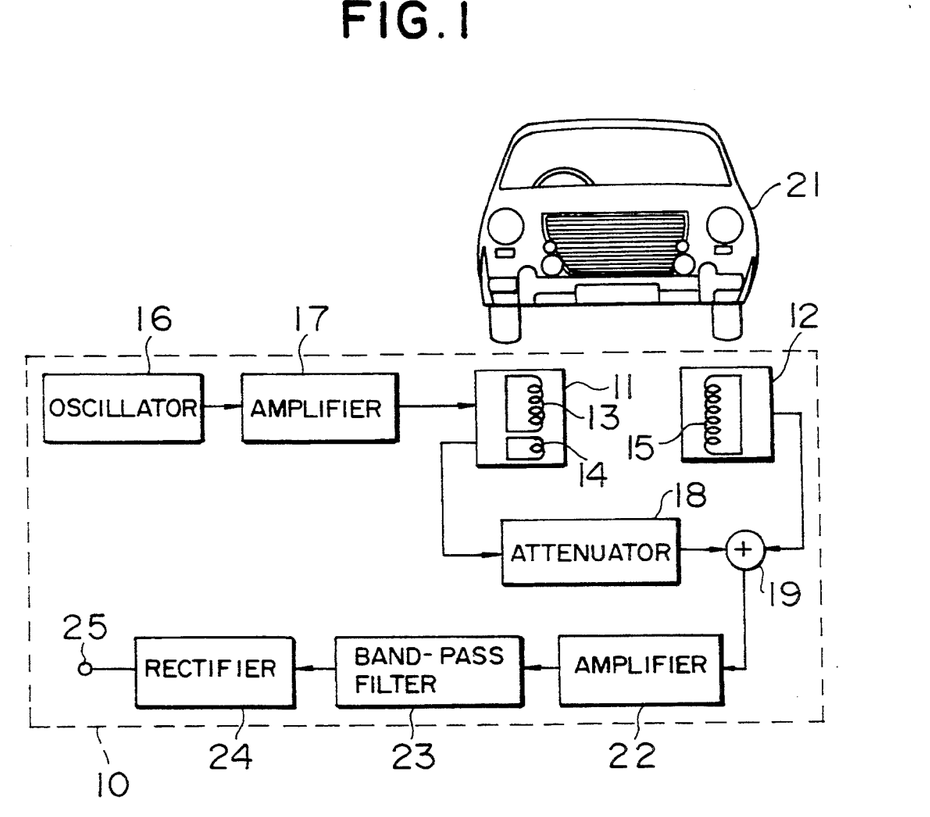
FIG. 1 is a block diagram showing a first embodiment of the object detecting device according to the present invention together with a vehicle as an object to be detected.

The output of the adder 19 is connected to a band-pass filter 23 through another amplifier 22 so that noises are removed from the output of the adder 19 amplified by the amplifier 22. The output of the band-pass filter 23 is connected to a rectifier 24 so as to be rectified therein into a DC signal, the output signal of the rectifier 24 being produced at an output terminal 25.

Figure 2:
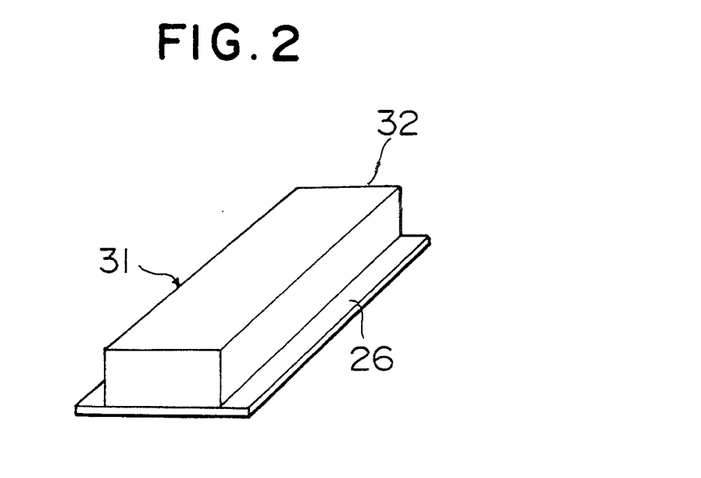
FIG. 2 is a perspective sectional view showing the exterior of the detecting device according to the first embodiment.
Figure 3:
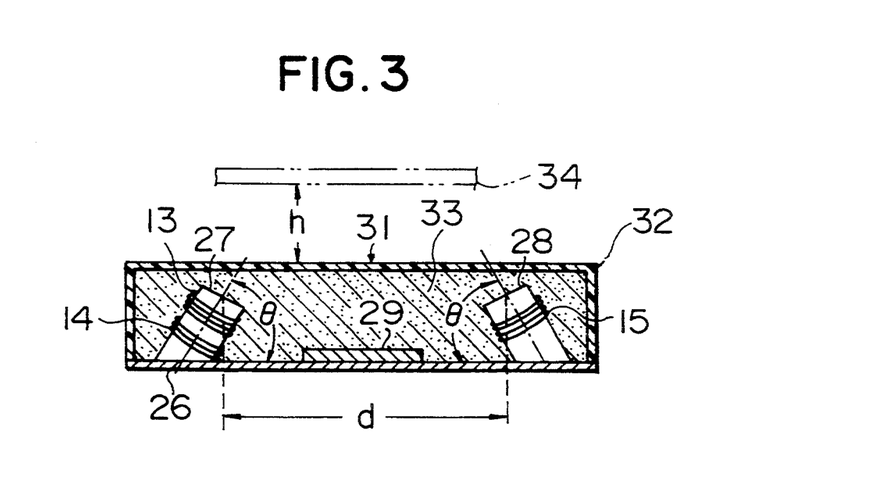
FIG. 3 is a longitudinal sectional view showing the object detecting device of FIG. 2.

Those constituent components mentioned above are mounted on a rectangular substrate 26 as shown in FIGS. 2 and 3. That is, a first cylinder 27 having the primary coil 13 and the take-out coil 14 of the transmission coil portion 11 wound thereon is attached at its lower end portion on the upper surface of the substrate 26 at its longitudinally one end portion, and a second cylinder 28 having the secondary coil 15 of the reception coil portion 12 wound thereon is attached at its lower end portion on the upper surface of the substrate 26 at its longitudinally other end portion. Each of the first and second cylinders 27 and 28 is planted slantingly at an angle of $\theta$ relative to the surface of the substrate 26 so that the virtual extensions of the respective axial lines of the first and second cylinders 27 and 28 cross each other. The distance between the respective top ends of the central axes of the first and second cylinders 27 and 28 is selected to be d as shown in FIG. 3. A printed circuit board 29 on which the electrical components such as the foregoing oscillator 16, the amplifier 17, and so on are connected to each other is mounted on the substrate 26 at a portion between the first and second cylinders 27 and 28. The substrate 26 may be a plate of insulated metal or synthetic resin. In the case where the object detecting device is set in a structure such as a three-dimensionally structured parking zone so that a metal plate or the like may be located under the object detecting device, it is preferable that the substrate 26 is made of a magnetically shielding material such as an iron plate to prevent any magnetic influence due to the metal plate. The upper surface of the substrate 26 is covered with a cover 32 constituted by side walls and a ceiling plate. It is a mater of course that at least top portion or the ceiling plate of the cover 32 is made of a nonmagnetic material such as polyvinyl chloride, hard glass, or the like, which is not magnetically influenced by magnetic flux.

In the first embodiment, the object detecting device 10 is used as a wheel stopping block 31. Accordingly, the cover 32 is filled with a filler 33 of a nonmagnetic material, such as foamed hard urethane, asphalt, or the like, which is not magnetically influenced by magnetic flux, so that the wheel stopping block 31 is mechanically strengthened by the filler 33 so that the object detecting device 10 is prevented from being damaged when tires of a vehicle run against the wheel stopping block 31. The wheel stopping block 31 is provided at a rear portion in each of parking sections of a parking zone.

In setting of the detecting device 10, the quantity of attenuation of the attenuator 18 is adjusted in advance so that the sum of the opposite-phase voltage obtained by attenuating the output of the take-out coil 14 for producing an antiphase voltage which corresponds to the magnetic flux generated in the primary coil 13 and the in-phase output voltage of the secondary coil 15 generated in response to the supplied magnetic flux from the primary coil 13 is made to be zero when no vehicle 21 is present in the predetermined effective detection range above the wheel stopping block 31. Thus, the output of the adder 19 is zero so that no output appears at the output terminal 25. When the vehicle 21 is parked so that the front wheels are close to the wheel stopping block 31 as shown in FIG. 1, a part of the vehicle 21 is present in the predetermined effective detection range above the wheel stopping block 31, so that a large quantity of magnetic flux generated in the primary coil 13 is transmitted into the secondary coil 15 through a bottom steel plate portion of the vehicle 21 to thereby induce a higher voltage in the secondary coil 15. The sum of the respective output voltages of the attenuator 18 and the secondary coil 15, that is, a differential voltage between the respective absolute values of the output voltage of the attenuator 18 and the higher output voltage of the secondary coil 15 is produced as an output of the adder 19. The differential voltage is amplified in the amplifier 22 so as to have a predetermined level. After subjected to noise removal in the band-pass filter 23, the output of the amplifier 22 is supplied to the rectifier 24 so as to be rectified into a DC signal in the rectifier 24, the output of the rectifier 24 being supplied to the output terminal 25. Therefore, the fact that the vehicle 21 is properly parked in the parking section can be recognized by detecting appearance of a voltage at the output terminal 25.

Figure 4:
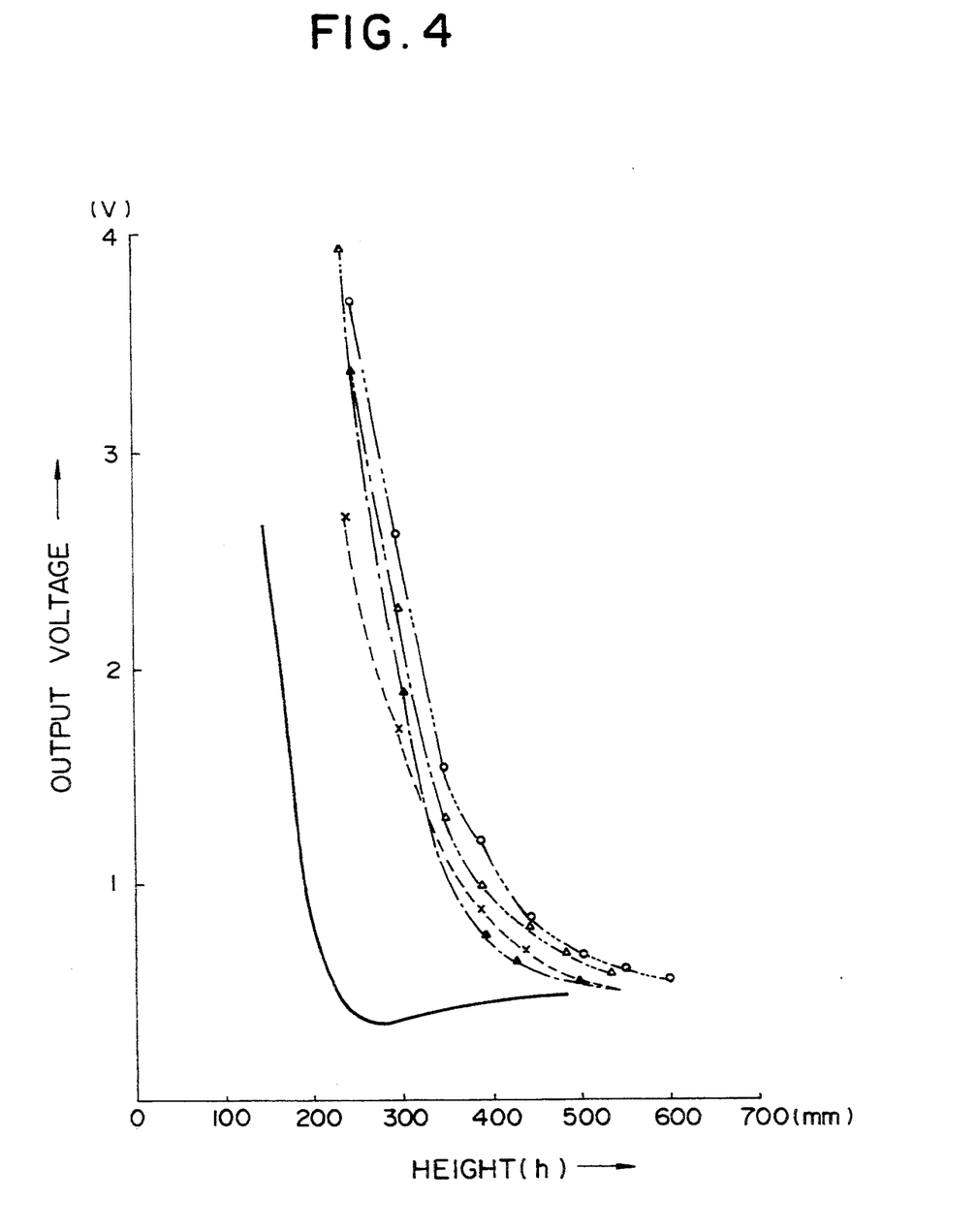
FIG. 4 is a graph showing the relation between the height of an object to be detected and the output voltage when the primary and secondary coils in the first embodiment are variously inclined.

Here, in order to examine the relation between the output voltage and the inclination angle of each of the primary and secondary coils 13 and 15, the relation between the output voltage and the height (h) from the road surface to the bottom potion of a vehicle was examined in the cases where each of the coils 13 and 15 was planted on the substrate 26 uprightly or at an angle of 90 degrees, 75 degrees, 60 degrees and 45 degrees respectively. The height (h) of the vehicle cannot be changed desiredly. Accordingly, an iron plate 34 was prepared, and on the assumption that the iron plate 34 was the bottom plate of the vehicle as shown by a two-dot chained line in FIG. 3, the height (h) of iron plate 34 from the road surface was changed variously by 10 cm. The graph of FIG. 4 shows the results. In the graph in which the abscissa represents the height (h) of the iron plate to be detected and the ordinate represents the voltage value appeared at the output terminal 25, the curve of a solid line shows the case where each of the coils 13 and 15 was planted uprightly or at an angle of 90 degrees, the curve of a broken line shows the case where each of the coils 13 and 15 was inclined at an angle of 75 degrees, and the curve of a one-dot chained line shows the case where each of the coils 13 and 15 was inclined at an angle of 60 degrees. In each of those three cases, the distance (d) between the coils 13 and 15 was selected to be 300 mm. Further, in the same graph, the curve of two-dot chained line shows the case where each of the coils 13 and 15 was inclined at an angle of 60 degrees with the distance (d) between the coils 13 and 15 selected to be 400 mm, and the curve of a three-dot chained line shows the case where each of the coils 13 and 15 was inclined at an angle of 45 degrees with the distance (d) between the coils 13 and 15 selected to be 490 mm. As seen from the graph, it has been found that in the case where each of the coils 13 and 15 was planted uprightly or at an angle of 90 degrees, the output voltage rapidly decreased when the height (h) of the iron plate to be detected was not higher than 200 mm, while, in the cases where each of the coils 13 and 15 was inclined at an angles of 75 degrees, 60 degrees, and 45 degrees, the output of 1 volt could be obtained even in the case where the height (h) was approximate to 400 mm. Further, it was found that in the case of the inclination angle of 60 degrees, a not so large change was generated even when the distance (d) between the coils 13 and 15 was increased from 300 mm to 400 mm.

Figure 5:
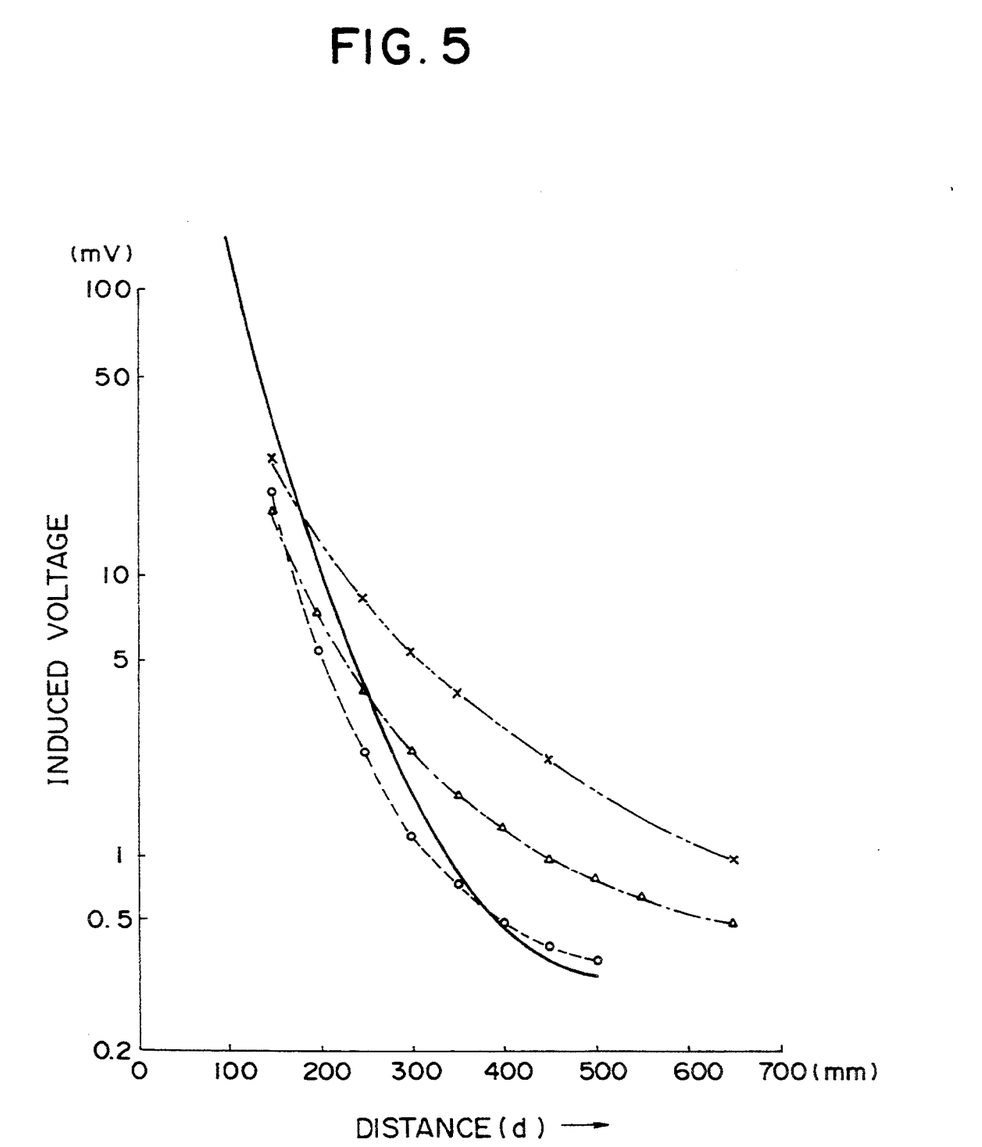
FIG. 5 is a graph showing the relation between the distance between the primary and secondary coils in the first embodiment and the transmission level to the secondary coil when the primary and secondary coils are variously inclined.

Next, the relation between the induced voltage in the secondary coil 15 due to the magnetic flux generated from the primary coil 13 and transmitted to the secondary coil 15 and the distance (d) between the coils 13 and 15 was examined while changing the inclination angle of each of the coils 13 and 15. FIG. 5 shows the results of the examination. In FIG. 5, the curve of a solid line shows the case where each of the coils 13 and 15 was planted uprightly or at an angle of 90 degrees, the curve of a broken line shows the case where each of the coils 13 and 15 was inclined at an angle of 75 degrees, the curve of a one-dot chained line shows the case where each of the coils 13 and 15 was inclined at an angle of 60 degrees, and the curve of a two-dot chained line shows the case where each of the coils 13 and 15 was inclined at an angle of 45 degrees. It was found from the graph that if each of the coils 13 and 15 was inclined at an angle in a range of from 45 degrees to 60 degrees, a voltage of 0.5 mV or more was induced in the secondary coil 15 even when the coils 13 and 15 were separated from each other by a distance of 600 mm.

It was found from the foregoing results that if each of the coils 13 and 15 was planted slantingly at an angle in a range of from 45 degrees to 60 degrees, it was possible to obtain an induced voltage level of 1 mV or more even when the distance (d) between the coils 13 and 15 was separated in a range of from 450 mm to 600 mm. Since the two coils 13 and 15 can be disposed separately from each other, it is prevented such a maloperation from occurring to detect a can of a drinking matter as a vehicle to be detected even if such a can or the like rolls onto the object detecting device.

When such object detecting devices are set in respective parking sections in a parking zone or in a parking building in which a large number of vehicles may be parked, if indicators such as lamps, LEDs, or the like are provided so as to be turned on/off on the basis of the signals appearing at the output terminals 25 of the respective object detecting devices 10, a manager of the parking zone or the parking building can grasp the state of use as a whole by concentratively controlling the indicators, and if a concentrative display plate is provided in an inlet or the like of the parking zone or the parking building, it is possible to inform an incoming vehicle of the fact that all the parking sections are filled or which parking sections are empty. In the case of detecting a large number of vehicles as described above, the detection signals in the respective parking sections may be made to be different in frequency one another to discriminate the detection voltages one another. Further, with variations in kind of vehicles, not only a vehicle having a relatively low body height from the road surface to the bottom portion of the vehicle body but a vehicle such as a so-called off-road type 4 WD car having a high body height from the road surface to the bottom portion of the vehicle body come to park. In order to surely detect the vehicles, the sensitivity of each of the object detecting devices may be made high.

If the sensitivity of a detecting device in one parking section is made high, however, there is a possibility that the object detecting device may detect vehicles parking in adjacent parking sections. To prevent such erroneous detection, it is necessary to provide a band-pass filter in each of the object detecting devices so as to discriminate its own frequency to thereby detect only its own output voltage of each object detecting device. However, there has been a disadvantage in that a band-pass filter is low in phase stability against temperature variations and it is apt to make a maloperation when the temperature becomes very high particularly in summer.

Then, in a second embodiment, the sensitivity is made high without being affected by the open-air temperature even in the case of using a band-pass filter. The second embodiment will be described with reference to FIGS. 6 and 7. In the second embodiment, the output side of a take-out coil 14 of a transmission coil portion 11 is connected to a rectifier 35 through an attenuator 18. The rectifier 35 is provided for rectifying an AC output voltage from the attenuator 18 into a DC output voltage so as to take-out the amplitude thereof, the output of the rectifier 35 being connected to one input of an adder 19. The output of a secondary coil 15 of a reception coil portion 12 is connected to the input of a rectifier 37 through a band-pass filter 36 for discriminating a predetermined frequency generated from an oscillator 16. The output of the rectifier 37 is connected to the other input of the adder 19. The respective outputs of the rectifiers 35 and 37 are made to be opposite in polarity to each other. The adder 19 is provided for adding the respective amplitude values of the two output voltages which have opposite polarities, and the attenuation level of the attenuator 18 is adjusted in advance so that when no vehicle is present in a predetermined effective detection range above the transmission and reception coil portions 11 and 12, the sum of the amplitudes of the respective output voltages of the take-out and secondary coils 14 and 15 is equal to zero. The output of the adder 19 is produced from an output terminal 25 only through an amplifier 22. Similarly to the first embodiment, the object detecting device 10 is mounted on a substrate 26 and covered with a cover 32 so as to constitute a wheel stopping block 31.

Figure 6:
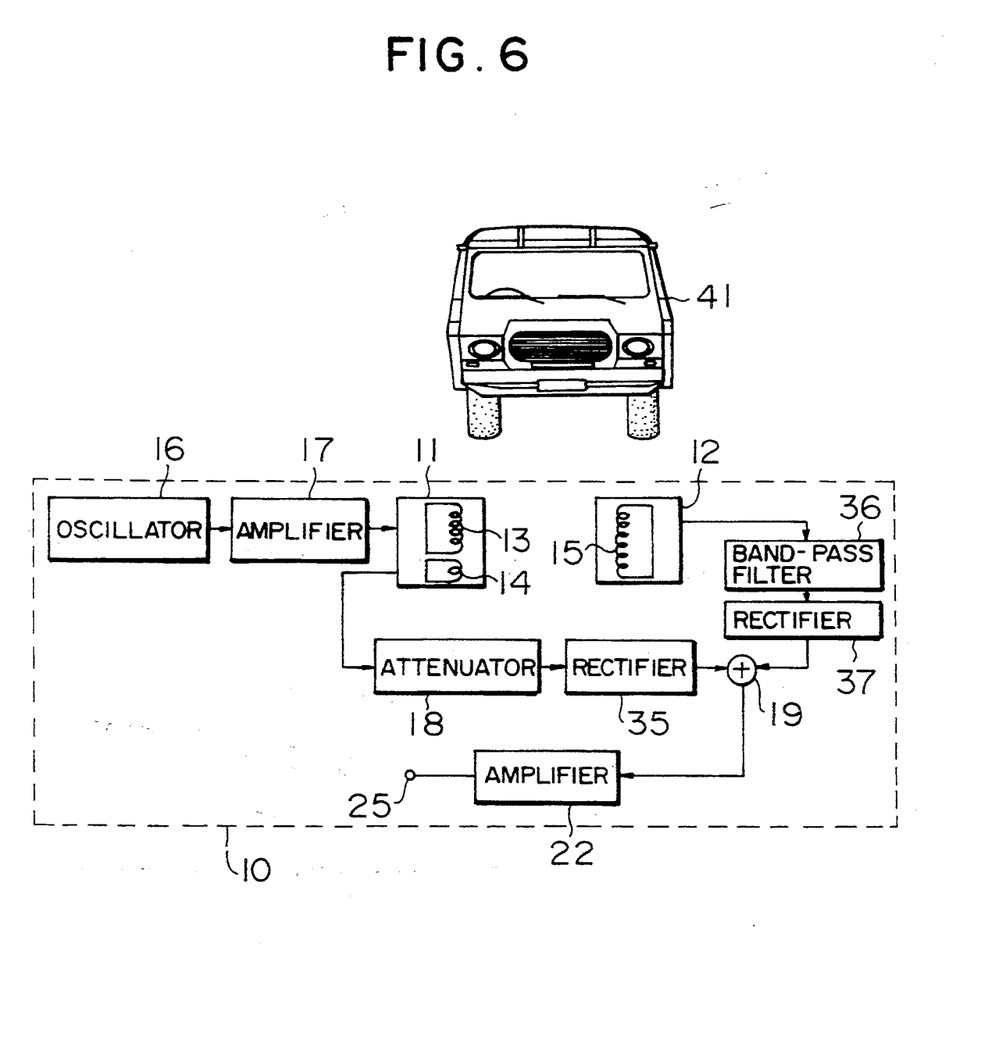
FIG. 6 is a block diagram showing a second embodiment of the object detecting device according to the present invention together with a vehicle as an object to be detected.

That is, the output voltage of the take-out coil 14 is converted into a DC voltage through the rectifier 35, the output voltage of the secondary coil 15 is converted into a DC voltage in the rectifier 37 so as to be opposite in polarity to the rectified output voltage of the take-out coil 14, and the respective amplitude values of the two output DC voltages are added in the adder 19. The quantity of attenuation of attenuator 18 is adjusted in advance so that the output of the adder 19 is equal to zero when no vehicle is present in the predetermined effective detection range above the object detecting device 10. Therefore, the output of the adder 19 is made to be zero and no output appears at the output terminal 25. When a vehicle 41 is parked in the predetermined effective detection range above the object detecting device 10 as shown in FIG. 6, a large quantity of magnetic flux of the primary coil 13 is transmitted to the secondary coil 15 through a bottom steel plate portion of the vehicle 41 to thereby induce a high voltage in the secondary coil 15. The induced voltage of the secondary coil 15 is converted into a DC voltage in the rectifier 37 and the output voltage from the take-out coil 14 is also rectified by the rectifier 35 into a DC voltage opposite in polarity to the DC voltage from the rectifier 37 and the thus obtained two DC voltage opposite in polarity are added in the adder 22. In other words, a difference between the absolute values of the two DC voltages is obtained in the adder 22 and the thus obtained difference voltage value from the adder 22 is amplified in the amplifier 22 to have a predetermined level. The output of the amplifier 22 is outputted from the output terminal 25 as a DC signal which is increased by the presence of the vehicle 41.

Thus, the output voltage of the take-out coil 14 for taking out a voltage corresponding to the magnetic flux generated in the primary coil 13 and the output voltage of the secondary coil 15 generated in response to the magnetic flux transmitted from the primary coil 13 are converted by the rectifiers 35 and 37 respectively into DC output voltages which are opposite in polarity to each other and the respective amplitude values of the DC output voltages opposite in polarity are added to each other in the adder 19 in the next stage. Therefore, even if the frequency characteristic of the band-pass filter 36 is changed more or less by a temperature change to thereby generate a phase shift between the outputs of the take-out and secondary coils 14 and 15, the rate of change of the output amplitude of the band-pass filter 36 due to its frequency character change is negligibly small within the frequency band of the band-pass filter 36 so that no voltage value is additionally generated because of a phase shift due to a temperature change to the output voltage which has been adjusted to be zero in advance. Thus, it is possible to prevent erroneous detection due to the improvement of the sensitivity. Accordingly, even when a vehicle 41 having a body height from the road surface to the bottom portion higher than that of an ordinary car is parked, detection can be surely performed.

Figure 7:
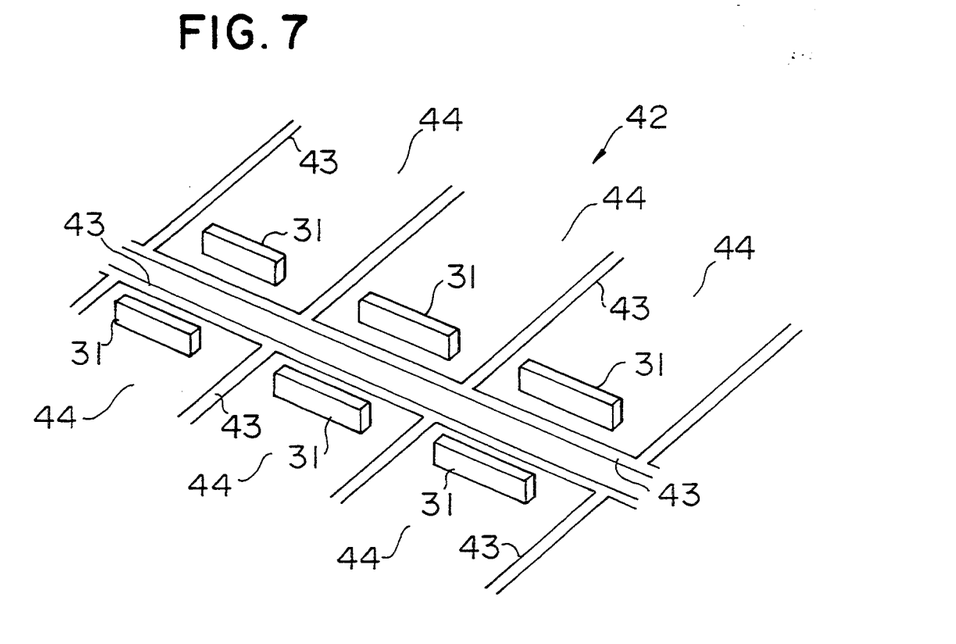
FIG. 7 is a perspective view showing a part of a parking zone where a detecting device according to the second embodiment is used as a stopping block.

Further, as shown in FIG. 7, even when the object detecting device 10 is used as the stopping block 31 in the same manner as in the first embodiment in a parking zone 42 in which lines 43 are drawn at internals slightly wider than the width of a vehicle to thereby set parting sections 44 so that adjacent parking sections are close to each other, it is possible to accurately detect presence of a vehicle in the target parking section 44 without erroneous detection of vehicles parked in the frontside, rearside, rightside and leftside parking sections adjacent to the target section. In this case, the outputs of the vehicle detecting devices 10 in the respective parking sections 44 are successively scanned so as to check whether an output voltage is obtained or not in each of the output terminals 25 so that presence of a vehicle in each of the parking sections 44 can be judged. At this time, digital control may be performed if the detecting device is arranged so as to output a high-level pulse signal when the output voltage of the amplifier 22 is generated and so as to output a low-level pulse signal when no output voltage of the amplifier 22 is generated. At this time, if the signal is collectively controlled in a control room or the like, the parking state of the whole parking zone 42 can be quite clearly detected. Further, if lamps are arranged so as to be turned on in response to the respective outputs of the output terminals 25 and if a map showing the whole of the parking zone in which the lamps are disposed in places corresponding to the parking sections respectively is disposed on a guide board provided in an inlet or the like of the parking zone, a user can easily know the position of an empty parking section in which the lamp is not turned on.

Although the output of the primary coil 13 is taken out by the take-out coil 14 in the polarity opposite to that of the secondary coil 15 and the respective outputs of the coils 14 and 15 opposite in polarity to each other are added in the adder 19 in the second embodiment, the arrangement may be modified such that the output of the primary coil 13 is taken out by the take-out coil 14 in the same polarity with that of the secondary coil 15 and a difference between the respective outputs of the coils 14 and 15 the same in polarity with each other is calculated by a subtracter in place of the adder 19.

Figure 8:
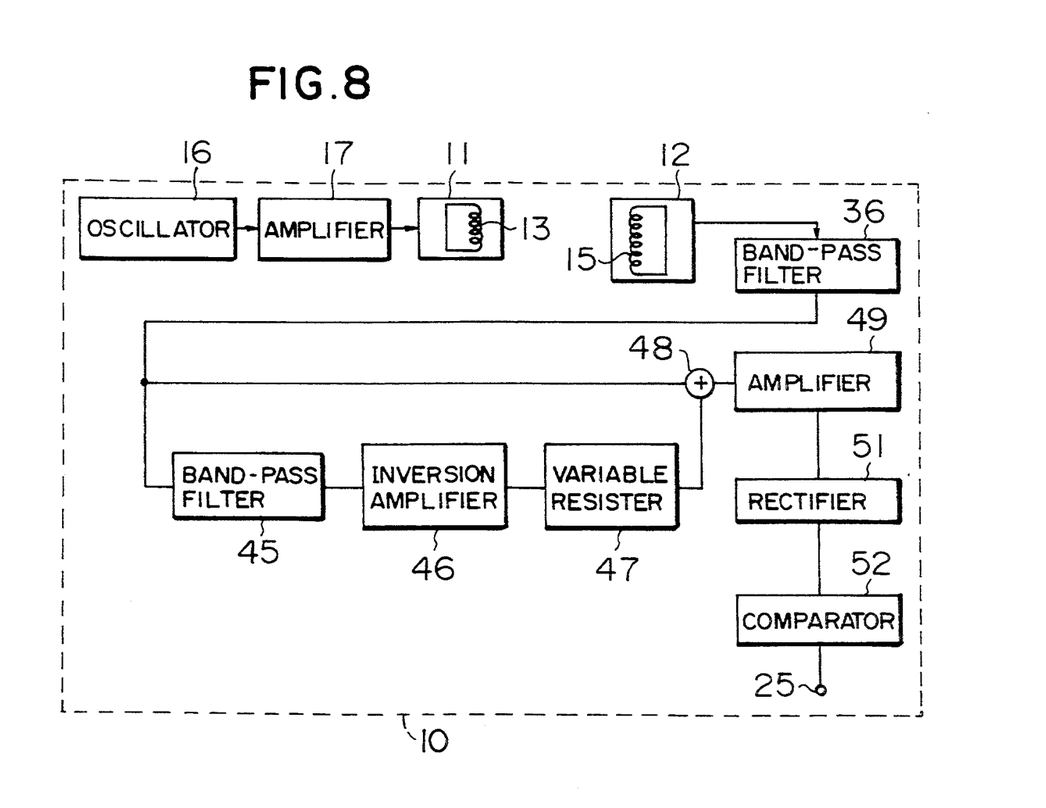
FIG. 8 is a block diagram showing a third embodiment of the object detecting device according to the present invention.

FIG. 8 shows a third embodiment in which the sensitivity is improved without affected by the out-air temperature even in the case of using band-pass filters similarly to the case of the second embodiment. In the third embodiment, presence of a vehicle is detected on the basis of a change of a voltage level. In this embodiment, a transmission coil portion 11 is constituted only by a primary coil 13. The output side of a secondary coil 15 of a reception coil portion 12 is connected to a band-pass filter 36 for discriminating a predetermined frequency generated from an oscillator 16. The output of the band-pass filter 36 is connected to a band-pass filter 45 and one input of an adder 48. The output of the band-pass filter 45 is connected to the other input of the adder 48 through an inversion amplifier 46 and a variable resistor 47. The inversion amplifier 46 acts to saturate a signal which is passed through the band-pass filter 45 when no vehicle is present so that the inversion amplifier 46 outputs a signal having a predetermined voltage level even when a signal having a voltage level higher than the above predetermined voltage level is inputted. Thus, the output signal of the inversion amplifier 46 which is shaped into an inverted square signal is applied to the adder 48 through the variable resistor 47. The band-pass filter 45 is provided to remove noise components as much as possible from the signal which is then amplified by the inversion amplifier 46. The variable resistor 47 functions as an output adjusting means for making the output of the adder 48 have a certain level when no vehicle is present. The output of the adder 48 is connected to a comparator 52 through an amplifier 49 and a rectifier 51 for converting an applied AC signal into a DC signal. The comparator 52 compares the actual output of the adder 48 with the preset output of the adder 48 when no vehicle is present and supplies a predetermined pulse signal to the output terminal 25 when the actual output has a higher level than the level of the preset output.

In this structure, the output voltage of the secondary coil 15 generated in response to the transmitted magnetic flux from the primary coil 13 is sent to the band-pass filter 36 and then supplied to the adder 48 and the band-pass filter 45. The output voltage of the band-pass filter 45 is subjected to phase inversion and shaping into a square wave in the inversion amplifier 46. The output of the inversion amplifier 47 is supplied to the adder 48 after it is subjected to level adjustment in the variable resistor 47. That is, the positive signal from the band-pass filter 36 and a signal made to be negative in the inversion amplifier 46 are supplied the adder 48 so that a differential portion in level between the signals is outputted from at the output of the adder 48. Here, the variable resistor 47 is set in advance so that a certain level signal is produced from the adder 48 when no vehicle is present. This preset voltage level is stored in the comparator 52. Therefore, when no vehicle is present, the output of the comparator 52 is made to have a low level and as a result no signal appears at the output terminal 25. When a vehicle is parked in a predetermined effective detection range above the object detecting device 10, however, a large quantity of magnetic flux of the primary coil 13 is transmitted into the secondary coil 15 through a steel plate portion of the bottom portion of the vehicle so that a high voltage is induced in the secondary coil 15. The thus induced high voltage is supplied to the band-pass filter 36, the output of which is supplied as it is directly to the adder 48. The output of the band-pass filter 36 is further supplied to the adder 48 after inverted in phase in the inversion amplifier 46 and added with a predetermined level in the variable resistor 47. Since the output signal of the inversion amplifier 46 is saturated as described above, a fixed level voltage is supplied to the adder 48 through the variable resistor 47 even if the voltage applied from the band-pass filter 45 to the inversion amplifier 46 becomes large in any extent. Consequently, a differential voltage between the respective absolute values of the fixed level voltage supplied to the adder 48 through the variable resistor 47 and the voltage directly applied to the adder 48 is outputted from the adder 48. The comparator 52 compares the differential voltage with the preset signal level when no vehicle 24 is present. When the vehicle 24 is present, the voltage level is made high and therefore a high-level pulse signal appears at the output terminal 25.

Thus, a change of the output voltage of the secondary coil 15 generated in response to the magnetic flux transmitted from the primary coil 13 is detected as a level change. Therefore, even when the frequency characteristic of the band-pass filter 36 is changed more or less by a temperature change to thereby generate a phase shift between the outputs of the primary and secondary coils 13 and 15, the rate of change of the output level of the band-pass filter 36 due to its frequency character change is negligibly small within the frequency band of the band-pass filter 36 so that presence of a vehicle can be always accurately detected even when a phase shift due to a temperature change is generated in the output voltage adjusted in advance and it is possible to prevent a maloperation due to an improvement of the sensitivity. Accordingly, similarly to the second embodiment, vehicles of high and low body height from the road surface to the bottom portion can be surely detected and even when the detecting device is set in each of the parking sections of a parking zone or the like in which the interval between adjacent parking sections is narrow, vehicles parked in adjacent parking sections are not erroneously detected.

Although, the variable resistor 47 acts to make the adder 48 produce a predetermined level output voltage when no vehicle is present in the above third embodiment, presence of a vehicle can be judged on the basis of presence of the output of the adder 48 if the variable resistor 47 is adjusted so that the output of the adder 48 is equal to zero when no vehicle is present. In this case therefore, the comparator 52 can be omitted.

Although the object detecting device 10 is provided in the wheel stopping block 31 in each of the foregoing embodiments, the object detecting device 10 may be buried in asphalt or concrete pavement in each of parking sections. Since magnetic flux can pass as it is through a non-magnetic material such as asphalt, concrete or the like, the detection sensitivity is not reduced. It is a matter of course that the object detecting device may be utilized in the case where it is set in an inlet or outlet of a parking zone to detect an incoming/outgoing vehicle to thereby grasp a using state or in the case where it is set on a road to detect the quantity of traffic of vehicles.

Further, detection of a vehicle has been described by way of example in each of the foregoing embodiments. If the detecting device is set on each shelf stage of a container yard or a storehouse for storing a plurality of matters such as containers, goods-delivery boxes, or the like, having a magnetic substance such as iron or a magnetic-flux permeable material at least in their bottom portions, the containers, goods-delivery boxes can be collectively controlled. Further, although the primary and secondary coils 13 and 15 are accommodated with together in the casing 32, the coils 13 and 15 may be accommodated in individual casings separated from each other. Although the primary and secondary coils 13 and 15 are wound around bobbins of the first and second cylinders 27 and 28 respectively, it is of course that each of the bobbins is not limited to the cylinder and the detection circuit is constituted by bobbin-less coils.

Although the present invention has been described with respect to the preferred embodiments, the description is made so as to understand the present invention and the present invention may be variously modified unless it is departed from the scope of the claims attached herewith.

What is claimed is:

1. An object detecting device for detecting an object at least partly having a magnetic substance or magnetic-flux permeable material, comprising:
   detection coil means including a primary coil for generating magnetic flux and a secondary coil disposed separately from said primary coil at a predetermined interval for receiving the magnetic flux from said primary coil; and
   a detection circuit for detecting an increase of the magnetic flux transmitted to said secondary coil due to presence of said object within a space between said primary and secondary coils and for producing a signal representing the presence of said object, said detection circuit including a take-out coil for taking-out a voltage corresponding to the magnetic flux generated in said primary coil; comparison means for comparing voltages induced in said respective take-out and secondary coils; and adjustment means for adjusting an output voltage of said take-out coil so as to make an output of said comparison means be zero when said object is not present in a predetermined effective detection range above said object detecting device.

2. An object detecting device according to claim 1, in which said primary and secondary coils are provided slantingly relative to each other so that virtual extensions of the respective axial lines of said primary and secondary coils cross each other.

3. An object detecting device according to claim 2, in which each of said primary and secondary coils is planted on a substrate slantingly at an angle in a range of from 45 degrees to 60 degrees.

4. An object detecting device according to claim 1, in which said primary and secondary coils and said detection circuit are accommodated in a housing with a non-magnetic material disposed at least at an upper portion of said housing.

5. An object detecting device according to claim 4, in which a space in said housing is filled with a filler of a nonmagnetic material.

6. An object detecting device according to claim 1, in which said detection circuit detects said increase of the magnetic flux on the basis of a change of a voltage induced in said secondary coil.

7. An object detecting device according to claim 1, in which said detection circuit includes an oscillator for exciting said primary coil with a predetermined frequency.

8. An object detecting device according to claim 1, in which said detection circuit further includes rectifier means connected between said adjustment means and said comparison means and another rectifier means connected between said secondary coil and said comparison means for making the respective output voltages of said adjustment means and said secondary coil be opposite in polarity to each other.

9. An object detecting device for detecting an object at least partly having a magnetic substance or magnetic-flux permeable material, comprising:
   detection coil means including a primary coil for generating magnetic flux and a secondary coil disposed separately from said primary coil at a predetermined interval for receiving the magnetic flux from said primary coil; and
   a detection circuit for detecting an increase of the magnetic flux transmitted to said secondary coil due to presence of said object within a space between said primary and secondary coils and for producing a signal representing the presence of said object, said detection circuit including;
   setting means for setting a voltage induced in said secondary coil when said object is not present in a predetermined effective detection range above said object detecting device, said setting means including an inversion amplifier which is saturated with an output voltage of said secondary coil when said object is not present in said predetermined effective detection range above said object detecting device and inverts a phase of said output voltage of said secondary coil to thereby produce the phase-inverted output voltage of said secondary coil; and a variable resistor for adjusting the output of said inversion amplifier;
   secondary-coil comparison means for comparing the output voltage level of said setting means with a voltage level induced in said secondary coil, said secondary-coil comparison means producing an output signal of a predetermined level when said object is not present in said predetermined effective detection range above said object detecting device; and
   storage and comparison means for storing the output voltage level of said secondary-coil comparison means when said object is not present in said predetermined effective detection range above said object detecting device and for comparing the stored output voltage level with an output voltage level of said secondary-coil comparison means so as to produce said signal when the voltage level of said secondary-coil comparison means is higher than said storage voltage level.

10. An object detecting device for detecting an object at least partly having a magnetic substance or magnetic-flux permeable material, comprising:
    detection coil means including a primary coil for generating magnetic flux and a secondary coil disposed separately from said primary coil at a predetermined interval for receiving the magnetic flux from said primary coil; and
    a detection circuit for detecting an increase of the magnetic flux transmitted to said secondary coil due to presence of said object within a space between said primary and secondary coils, said detection circuit being connected to the secondary coil and producing a signal representing the presence of said object, said detection circuit including;
    setting means connected to the secondary coil, said setting means setting an output voltage induced in said secondary coil when said object is not present in a predetermined effective detection range above said object detecting device and providing a fixed level voltage when said object is present in the predetermined effective detection range; and
    secondary-coil comparison means connected to the secondary coil and said setting means, said secondary-coil comparison means comparing an output voltage level of said setting means with a voltage level induced in said secondary coil and producing the signal representing the presence of said object when the object is located in the space.

11. An object detecting device according to claim 10, further comprising storage and comparison means for storing the output voltage level of said secondary-coil comparison means when said object is not present in said predetermined effective detection range above said object detecting device, said storage and comparison means comparing the stored output voltage level with an output voltage level of said secondary-coil comparison means and producing said signal when the voltage level of said secondary-coil comparison means is higher than said storage voltage level.

* * * * *